United States Patent [19]

Wilson

[11] 3,909,032
[45] Sept. 30, 1975

[54] DOLLY SCOOPER HAND BRACKET
[75] Inventor: James D. Wilson, Newport Beach, Calif.
[73] Assignee: Banner Metals Division Intercole Automation, Inc., Compton, Calif.
[22] Filed: June 21, 1974
[21] Appl. No.: 481,518

[52] U.S. Cl. .............. 280/47.34; 214/373; 280/29; 280/402
[51] Int. Cl.² .......................................... B62B 3/04
[58] Field of Search ........ 280/402, 400, 410, 47.19, 280/47.34, 29, 33.99 S, 18; 214/373

[56] References Cited
UNITED STATES PATENTS
| | | | |
|---|---|---|---|
| 121,928 | 12/1871 | Brown | 214/373 |
| 1,860,518 | 5/1932 | Wells | 280/402 |
| 1,864,781 | 6/1932 | Wells | 280/402 |
| 3,105,604 | 10/1963 | Quayle | 280/402 UX |

FOREIGN PATENTS OR APPLICATIONS
982,424  1/1951  France .............................. 214/373

Primary Examiner—David Schonberg
Assistant Examiner—Michael J. Forman
Attorney, Agent, or Firm—Jessup & Beecher

[57] ABSTRACT

A hand bracket is provided for manipulating a train of wheeled dollies. The bracket includes a pair of spaced and parallel runners which are intended to be moved along the supporting surface under the bottoms of a plurality of aligned dollies. The bracket has an upturned handle at its rear end, and hook-shaped elongated transverse members mounted at its forward and rear ends. The runners of the bracket may be slipped under a train of aligned dollies until the forward end of the bracket protrudes beyond the first dolly of the train. The handle is then pushed downwardly to tilt the bracket about a pivot point at its rear end until the forward hook-shaped elongated member engages the front of the forward dolly. The bracket is then pulled back to assure engagement of the forward hook-shaped member with the front end of the forward dolly, and the rear end of the bracket is then pulled straight up to raise the rear elongated hook-shaped member, and to cause it to engage the rear end of the rear dolly. The dollies in the train are thereby coupled together by the hand bracket, and they can be moved from place to place as a unit, by the handle.

2 Claims, 2 Drawing Figures

U.S. Patent  Sept. 30,1975  3,909,032

DOLLY SCOOPER HAND BRACKET

BACKGROUND OF THE INVENTION

Wheeled dollies are in widespread use in warehouses and the like for supporting pallets, or stacks of trays, so that merchandise in the pallets or trays may be moved from one location to another. The wheels on the dollies are usually in the form of pivotally mounted casters. The bracket of the invention makes it easy for one person to align a plurality of loaded dollies into a train, and to couple the loaded dollies together so that they may easily be moved as a single unit. The bracket is constructed so that it can be easily slipped under the aligned dollies, and easily manipulated into an intercoupling position with respect to the dollies, even though the front end of the forward dolly is obstructed from view.

DETAILED DESCRIPTION OF THE ILLUSTRATED EMBODIMENTS

Figure 1:
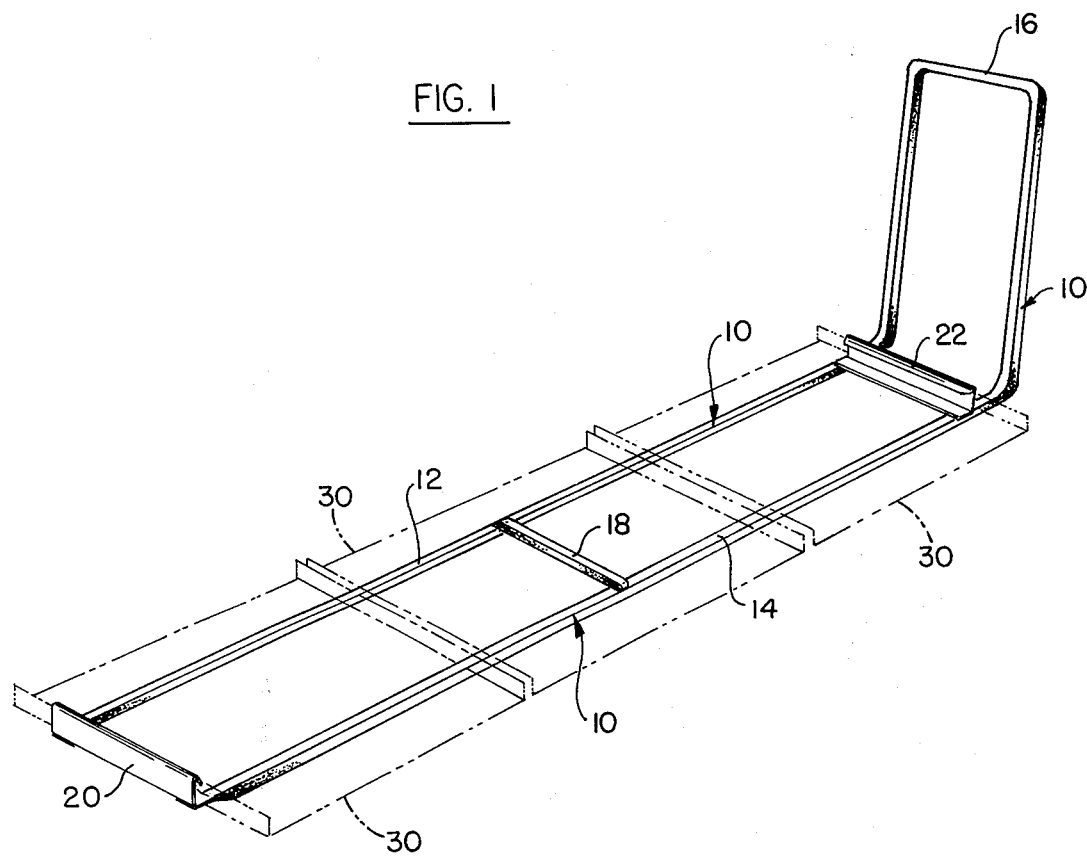
FIG. 1 is a perspective representation of the bracket of the invention.
Figure 2:
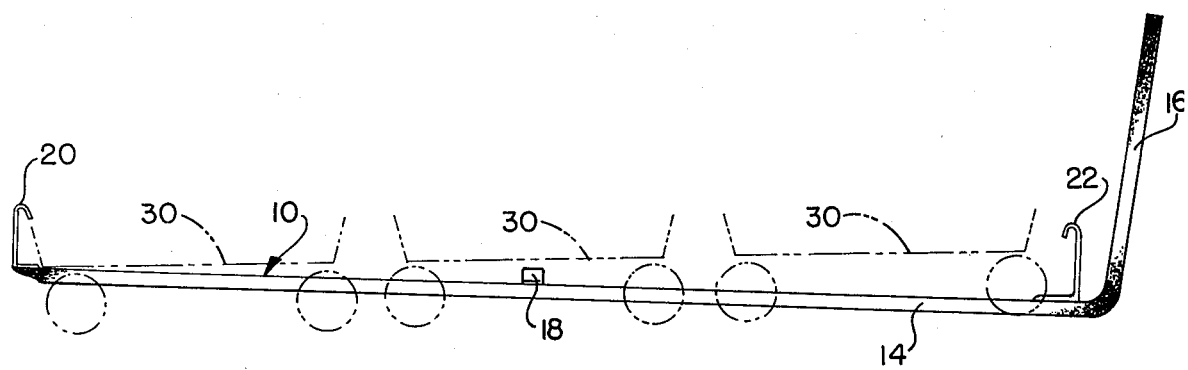
FIG. 2 is a side elevation of the bracket, showing it displaced under a train of three aligned dollies, shown as shadowed representations.

The bracket of the invention, as shown in the embodiment of FIGS. 1 and 2, includes a single U-shaped member 10, which provides a pair of side runners 12 and 14, and an upturned handle 16 at the rear end of the dolly.

The runners 12 and 14 are held apart by a central transverse member 18, and by a hook-shaped elongated member 20 at the forward end of the bracket and a hook-shaped elongated member 22 at the rear end of the bracket. The hook-shaped members 20 and 22 extend between the runners 12 and 14, and are attached to the runners.

As illustrated, the bracket formed by the U-shaped member 10 may be slipped under a train of aligned dollies 30 until the forward transverse hook member 20 protrudes in front of the forward dolly. The bracket may be then pivoted about its rear end, as shown in FIG. 2, by pushing down on the handle, until the forward hook-shaped bracket 20 engages the front end of the frame of the forward dolly 30. The rear end of the bracket 14 may then be lifted up until the hook-shaped member 22 engages the rear end of the last dolly 30 in the train. The dollies are now intercoupled by the bracket and they may be moved by the handle 16 as a unit.

The invention provides, therefore, an exceedingly simple bracket which has utility in warehouses, and other locations, to permit one person to intercouple a train of dollies, so that they may be easily moved as a unit.

It will be appreciated that while a particular embodiment of the invention has been shown and described, modifications may be made. It is intended in the claims to cover the modifications which come within the spirit and scope of the invention.

I claim:

1. A hand bracket for intercoupling a train of aligned wheeled dollies, each of the dollies having a bottom raised up from the supporting surface and a plurality of caster-like wheels suspended from the bottom, said bracket comprising: a pair of spaced side runners adapted to be moved along the supporting surface under the bottoms of the dollies from one end of the train to the other; a first transverse hook-shaped member mounted on the forward end of the bracket and attached to and extending from one of the side runners to the other in position to engage the front end of the forward dolly in the train; a second transverse hook-shaped member mounted on the rear end of the bracket and attached to and extending from one of said side runners to the other in position to engage the rear end of the last dolly in the train so that the runners of the hand bracket may be supported by the dollies up from the supporting surface; and an upstanding handle at the rear end of the bracket to the rear of said second transverse hook-shaped member and in position to enable the side runners of the bracket to be pivoted by the handle about said rear end of said bracket to permit the first hook-shaped member to engage the front end of the first dolly in the train, and in position to enable the rear end of the bracket to be lifted up by the handle until the second hook-shaped member engages the rear end of the last dolly in the train, so that the hand bracket may form an intercoupling means for the dollies.

2. The hand bracket defined in claim 1, in which said runners and handle are integrally formed of a U-shaped elongated member.

\* \* \* \* \*